(12) United States Patent
Contour et al.

(10) Patent No.: US 8,140,137 B2
(45) Date of Patent: Mar. 20, 2012

(54) COMPACT DISPLAY UNIT

(75) Inventors: Michael Joseph Contour, Del Mar, CA (US); Daniel Alexander van Oosten Slingeland, San Deigo, CA (US); Paul Michael Banasik, Lewisville, NC (US); Marquis D. Doyle, III, Clemmons, NC (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 11/519,319

(22) Filed: Sep. 11, 2006

(65) Prior Publication Data

US 2008/0064360 A1  Mar. 13, 2008

(51) Int. Cl.
 H04M 1/00 (2006.01)
 H04M 11/00 (2006.01)
 H04B 1/38 (2006.01)
(52) U.S. Cl. .................. 455/575.9; 455/73; 455/403
(58) Field of Classification Search ............... 455/575.9, 455/73
 See application file for complete search history.

(56) References Cited

U.S. PATENT DOCUMENTS

| | | | | |
|---|---|---|---|---|
| 5,678,196 | A * | 10/1997 | Doyle | 455/466 |
| 6,141,642 | A * | 10/2000 | Oh | 704/260 |
| 6,401,085 | B1 * | 6/2002 | Gershman et al. | 707/4 |
| 6,434,450 | B1 | 8/2002 | Griffin, Jr. et al. | |
| 6,559,773 | B1 * | 5/2003 | Berry | 340/815.4 |
| 6,847,892 | B2 * | 1/2005 | Zhou et al. | 701/213 |
| 2001/0029410 | A1 | 10/2001 | Obradovich | |
| 2003/0158762 | A1 * | 8/2003 | Wu | 705/5 |
| 2006/0155429 | A1 * | 7/2006 | Boone et al. | 701/1 |
| 2006/0211408 | A1 * | 9/2006 | Yamagishi et al. | 455/411 |
| 2006/0276940 | A1 * | 12/2006 | Berg et al. | 701/1 |

FOREIGN PATENT DOCUMENTS

| | | |
|---|---|---|
| EP | 1125784 | 8/2001 |
| WO | 0135373 | 5/2001 |

OTHER PUBLICATIONS

International Search Report—PCT/US07/077858, International Search Authority—European Patent Office—Apr. 23, 2008.
Written Opinion—PCT/US07/077858, International Search Authority—European Patent Office—Apr. 23, 2008.

* cited by examiner

*Primary Examiner* — Lester Kincaid
*Assistant Examiner* — Andy Gu
(74) *Attorney, Agent, or Firm* — Gerald P. Joyce, III

(57) ABSTRACT

A compact display unit that includes a mobile application server. The mobile application server is mounted in the vehicle for receipt and transmission of communications. The mobile application server is operatively connected to the compact display unit. The compact display unit presents to a vehicle operator a range of pre-selected permissive communications between the vehicle and a remote server by a vehicle operator during operation of the vehicle. This abstract is provided to comply with rules requiring an abstract that will allow a searcher or other reader to quickly ascertain the subject matter of the technical disclosure, but this abstract is not to be used to interpret or limit the scope or meaning of any claim.

11 Claims, 4 Drawing Sheets

COMPACT DISPLAY UNIT

BACKGROUND

1. Field

The apparatus and method disclosed and claimed in this document pertains generally to display units. More particularly, the new and useful compact display unit disclosed and claimed in this document pertains to an apparatus and method useful in a mobile satellite communications system that includes a mobile computing platform. The compact display unit is particularly, but not exclusively, useful for providing a button-activated, touch screen operated display unit, that excludes a keyboard but allows a vehicle driver or operator to select from a range of programmably permissive communications that may be transmitted between the vehicle and a mobile server, such as used by a vehicle dispatcher, and other remote servers within a mobile satellite communications system. The compact display unit is particularly, but not exclusively, useful for inter-communication between at least one base station such as a vehicle dispatcher and a means of transport.

2. Background

A system for at least two-way communications between one or more base stations such as a vehicle dispatcher, and a means of transport remote from the base station, is increasingly in demand. The demand is for a mobile satellite communications system that allows vehicle owners to track the location of vehicles, prevents misappropriation of a vehicle, enables communication between a vehicle and a vehicle dispatcher, enables optional communication among vehicle operators, allows selective communication with third parties, and monitors various problems confronted by vehicle operators in connection with a vehicle.

The term "means of transport" as used in this document includes not only such nonexclusive vehicles as ground-based motorized vehicles including trucks, cars, and trains, but also ships, boats, airborne means of transport, and the like (collectively in this document, "vehicle" or "vehicles").

The term "remote" as used in this document means either that one object is removed in space from another systemically interrelated but distant object or objects, or that one object has the capability of acting on, controlling, sending data to, or acquiring data from, such other systemically interrelated but distant object or objects, without coming in physical contact with one another.

Efforts to achieve communications between and among remote vehicles and vehicle dispatchers, for example, and to locate, track, identify, and communicate with such vehicles, has been enhanced by combining the U.S. Global Positioning System with a variety of hardware and software system components.

Demand in the industry now has grown to also require a new, useful and improved mobile satellite communications system with enhanced capabilities of intercommunication between at least one base station and one or more vehicles, such as the QUALCOMM® Mobile Computing Platform (in this document, for example, "QUALCOMM® mobile satellite communications system"). The compact display unit disclosed and claimed in this document provides new and useful features for such a mobile satellite communications system by providing an apparatus and system that permits a vehicle occupant to communicate from either a stationary or moving vehicle using a button-activated and touch screen operated display unit with enhanced safety features. The enhanced safety features include the exclusion of a conventional full keyboard associated with the compact display unit.

The absence of a conventional fully keyed keyboard enhances safety because a vehicle operator cannot enter data using a conventional keyboard during operation or transit of a vehicle. However, the compact display unit includes activation buttons that permit an operator to initiate a range of programmably permissive communications provided on a touch screen display from the vehicle to one or more remote servers without removing eye contact with the road and outside conditions, and to transmit a message to one or more remote servers across a QUALCOMM® mobile satellite communications system. These capabilities and features currently are not available to the industry.

SUMMARY

The compact display unit is operatively connectable to a mobile application server for transmission and receipt of a range of pre-selected permissive communications between the vehicle and a remote server by a vehicle operator during operation of the vehicle as well as while the vehicle is stationary.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the compact display unit will become apparent to those skilled in the art when read in conjunction with the following description, drawing figures, and appended claims.

The foregoing has outlined broadly the more important features of the invention to better understand the detailed description that follows, and to better understand the contributions to the art. The compact display unit is not limited in application to the details of construction, and to the arrangements of the components, provided in the following description or drawing figures, but is capable of other embodiments, and of being practiced and carried out in various ways.

The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions.

Further, the abstract associated with this disclosure is intended neither to define the compact display unit, which is measured by the claims, nor intended to limit the scope of the claims.

The novel features of the compact display unit are best understood from the accompanying drawing, considered in connection with the accompanying description of the drawing, in which similar reference characters refer to similar parts, and in which:

Figure 1:
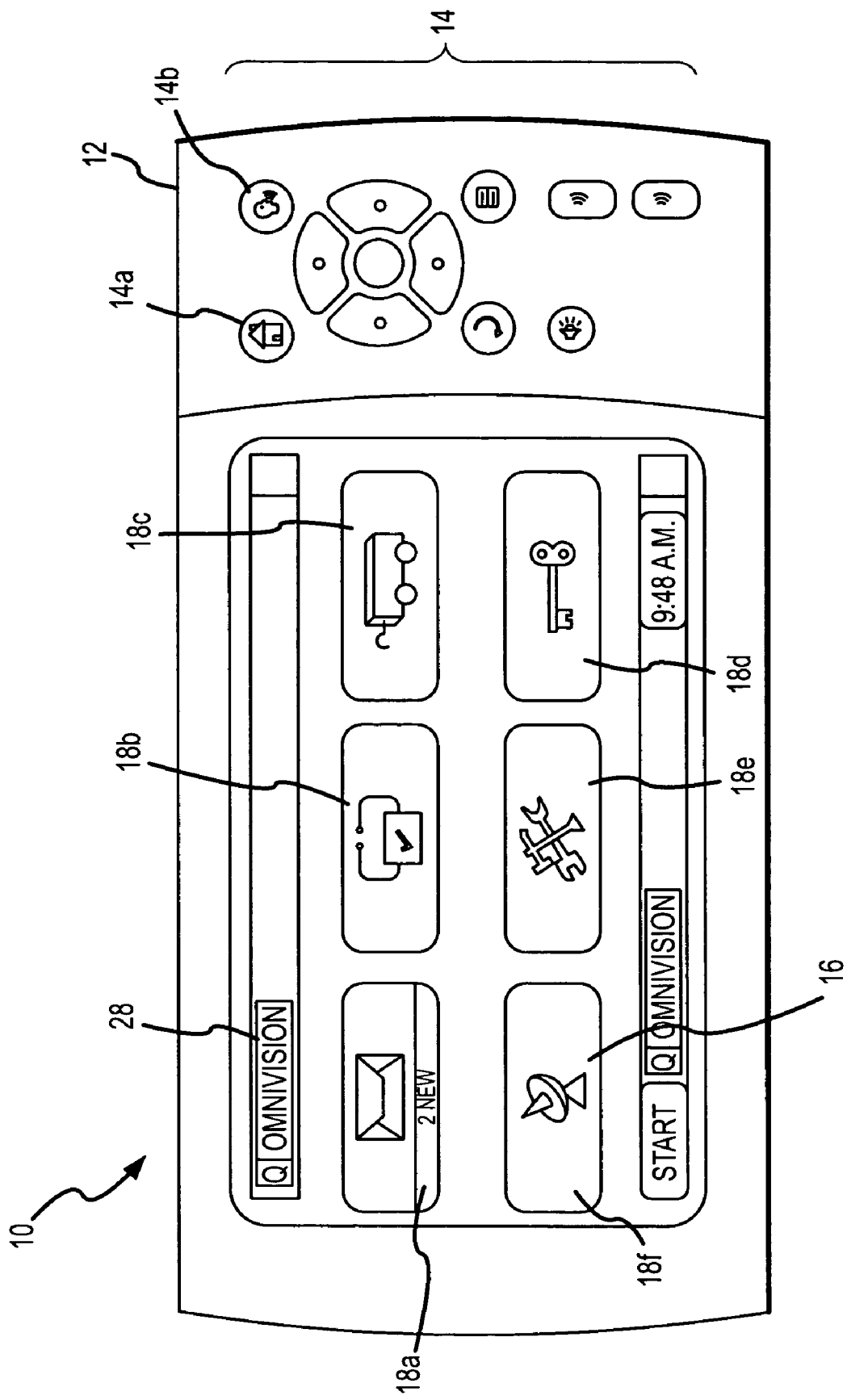
FIG. 1 of the drawing is a perspective view of the compact display unit.

Regarding the drawing figures, to the extent that subscripts to the numerical designations include the lower case letter "n," as in "a-n," the letter "n" is intended to express a number of repetitions of the element designated by that numerical reference and subscripts.

DETAILED DESCRIPTION

Figure 2:
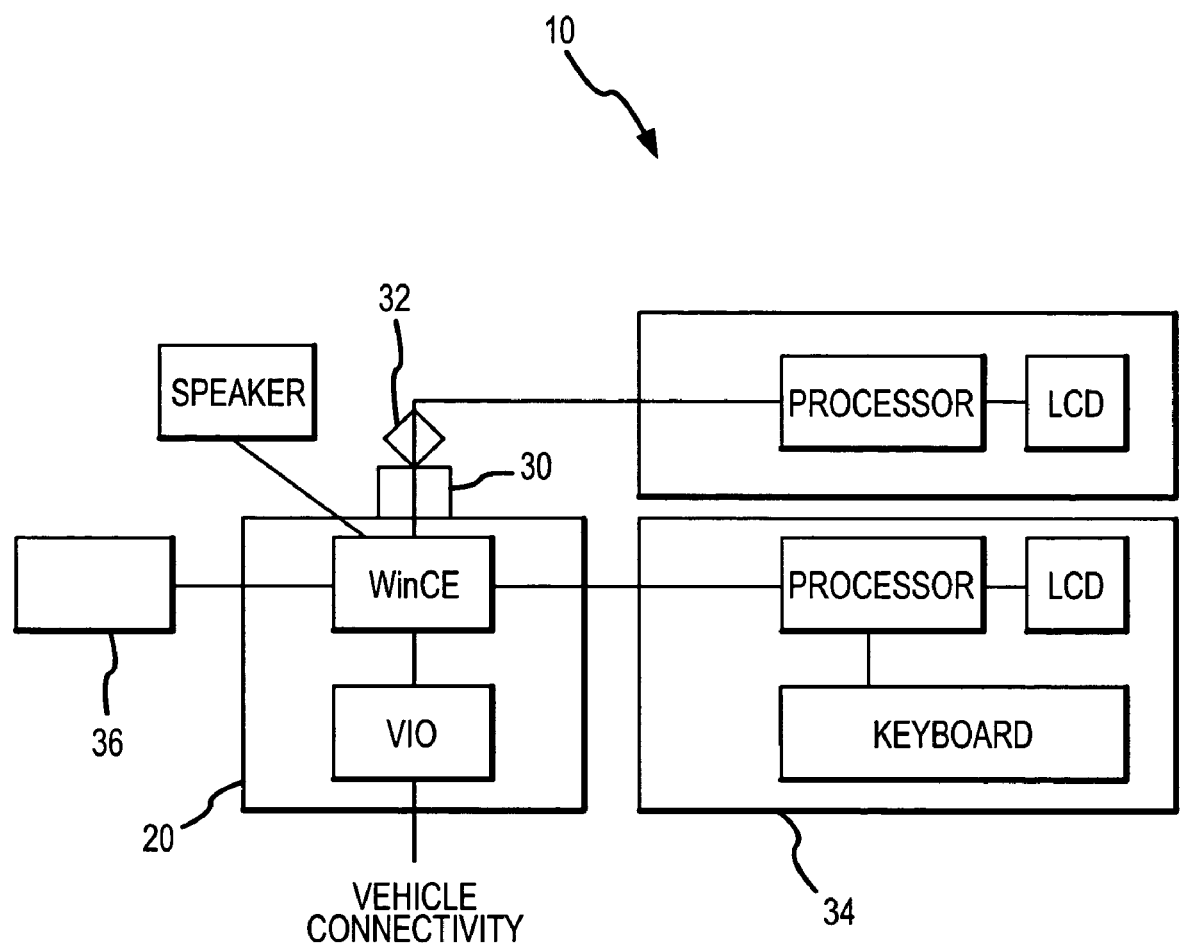
FIG. 2 is a block diagram illustrating the compact display unit operatively connected to other communications components.
Figure 3:
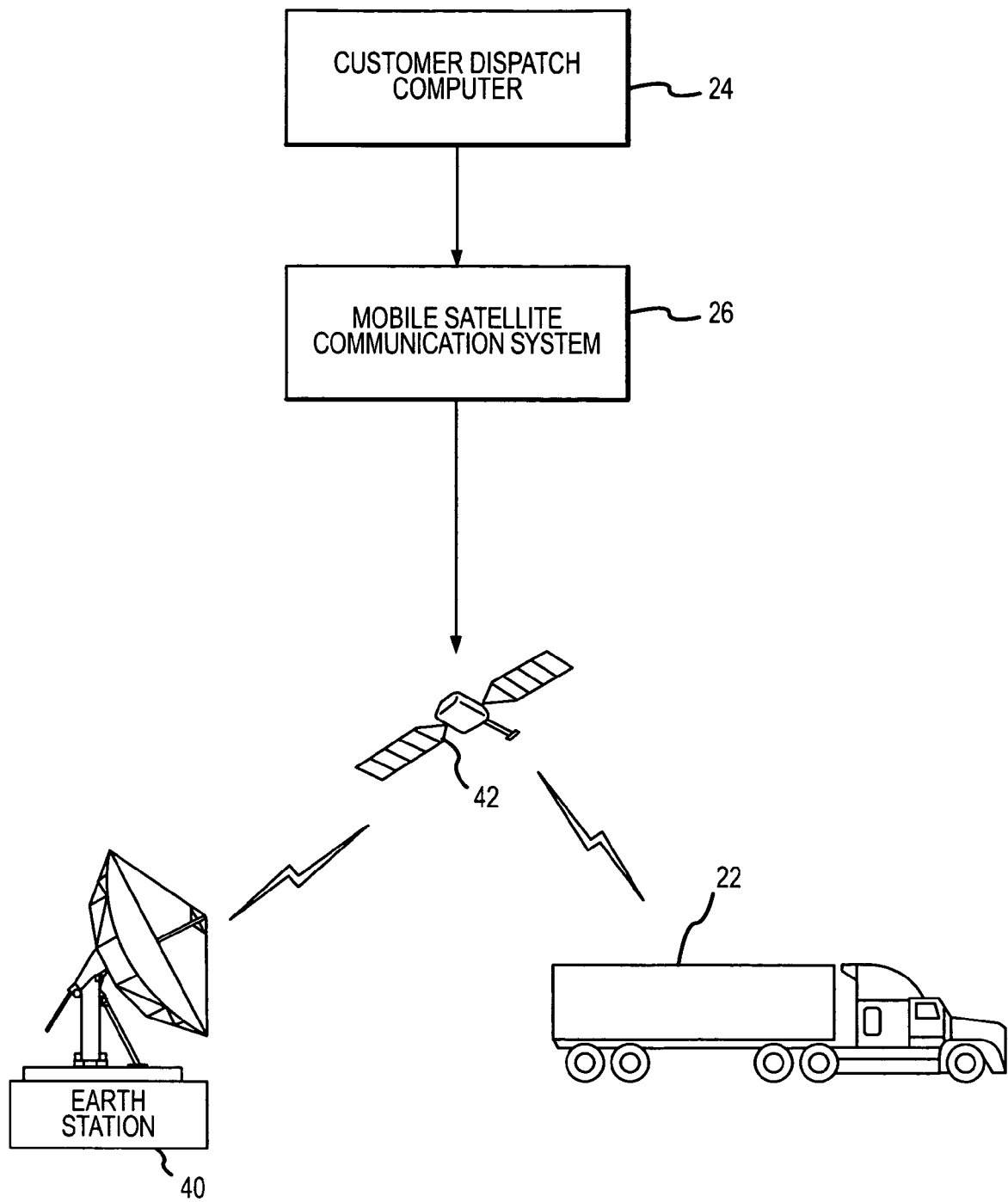
FIG. 3 is a block diagram illustrating the QUALCOMM® mobile satellite communications system.
Figure 4:
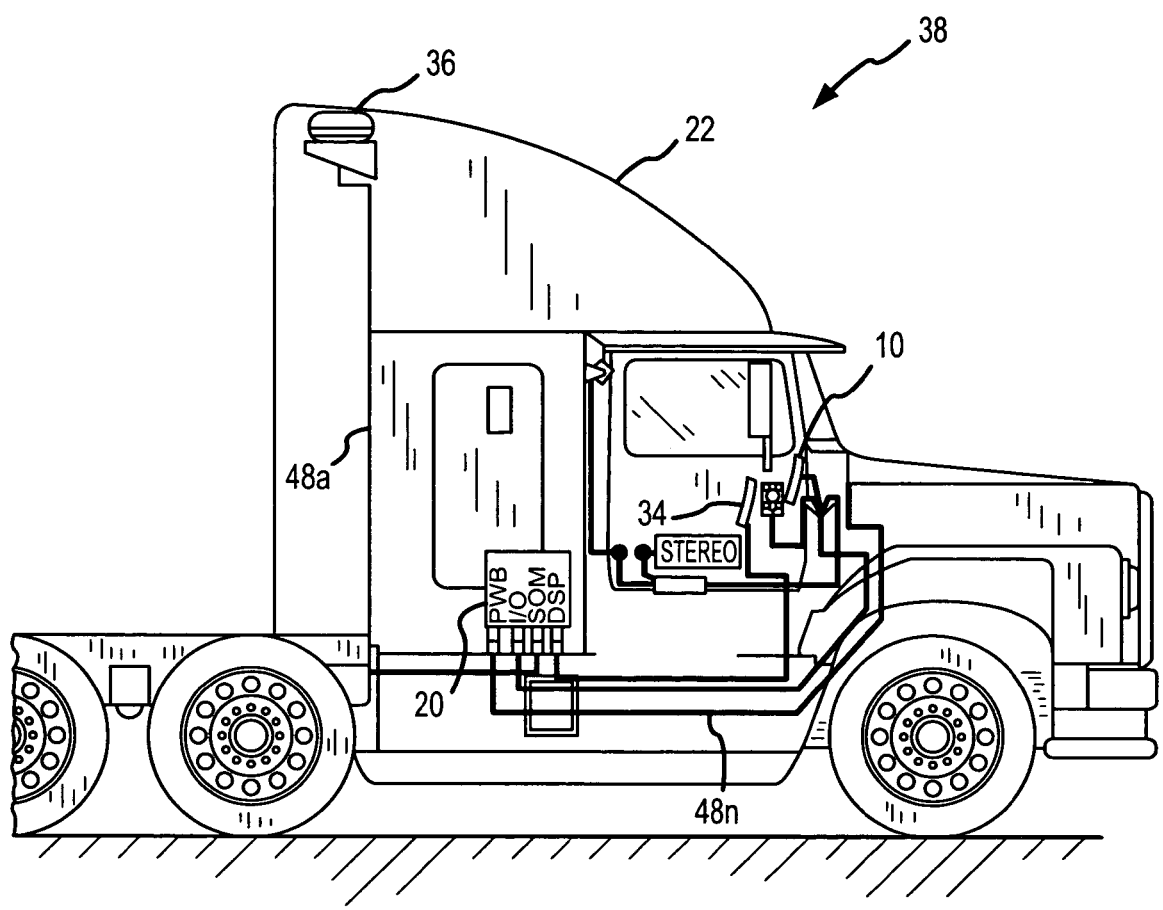
FIG. 4 is a side perspective view showing a vehicle and selected components of a mobile computing platform.

As shown in FIGS. 1-4, a compact display unit 10 is provided that in its broadest context includes a housing 12. An array of buttons 14 is positioned on housing 12. Array of buttons 14 is adapted to activate display unit 10. A monitor 16 is mounted in housing 12. The monitor 16 is adapted to visually present a range of programmable permissive communications 18a-f to a vehicle operator. A mobile server 20 is included. Mobile server 20 is mounted in the vehicle 22 and is operatively connected to the monitor 16. Mobile server 20 is capable of transmitting messages to, and receiving messages from, a remote server 24 in a QUALCOMM® mobile satellite communications system 26, which includes a mobile computing platform 38, selected components of which are illustrated in FIG. 4.

More specifically, as shown in FIG. 1, a compact display unit 10 may be mounted on a vehicle 22 shown by cross-reference between FIGS. 3-4. Optionally, compact display unit 10 may be removably mounted in vehicle 22 adjacent to and within comfortable viewing range of a vehicle operator on a gimbals device. Alternatively, the compact display unit 10 is sufficiently compact and lightweight to be removably mounted in vehicle 22 using double-sided Velcro® arrangements. The compact display unit 10 is operable by a vehicle operator while a vehicle 22 is either stationary or moving.

Array of buttons 14 is positioned on housing 12 of the compact display unit 10 within comfortable reach of the vehicle operator. Array of buttons 14 is used by the vehicle operator to activate compact display unit 10 to initiate communications over the compact display unit 10. Array of buttons 14 includes icons on the individual buttons 14a-n. The icons instruct the vehicle operator what activation step each button performs. For example, a "home" icon on individual button 14a is used by the vehicle operator to open a communications channel to a menu of communication options a user may select.

The monitor 16 mounted in housing 12 of compact display unit 10 includes a touch screen 28 that presents to the vehicle operator a range of programmable permissive communications 18a-f as shown in FIG. 1 in diagrammatic and graphic form. By touching programmable permissive communications 18a, for example, the vehicle operator can report to a vehicle dispatcher that a mechanical problem exists in connection with vehicle 22. The range of programmable permissive communications 18a-f is purposefully brief and limited for safety reasons: compact display unit 10 is provided for use by a vehicle operator during operation, movement, or transit of a vehicle 22 (collectively, "operation"). A vehicle operator, for example, may have navigation questions or problems to discuss with a vehicle dispatcher. Accordingly, compact display unit 10 requires only minimal finger movements by a vehicle operator to initiate and conduct communications about such emergency situations using compact display unit 10. For the same reason, a conventional keyboard is not connectable to compact display unit 10 to avoid operator distraction during vehicle operation.

As shown in FIG. 2, mobile server 20 is mounted in vehicle 22 and is operatively connected to the monitor 16 of compact display unit 10. Mobile server 20 is included to transmit messages sent by a vehicle operator by using touch screen 28 to send messages to a remote server 24, as well as to receive messages from one or more remote servers 24 across a QUALCOMM® mobile satellite communications system 26 as shown in FIG. 3. Mobile server 20 may be mounted in any convenient location on vehicle 22.

As also shown by cross-reference between FIGS. 2 and 4, mobile server 20 is operatively connected to compact display unit 10. In the embodiment shown in FIG. 2, a communications path between compact display unit 10 and mobile server 20 is included. The communications path includes at least one serial port 30, as shown diagrammatically in FIG. 2, mounted in mobile server 20. Conduit connectivity between compact display unit 10 and mobile server 20. Conduit connectivity between compact display unit 10 and mobile server 20 also is included. In addition, the communications path includes a virtual network computing link 32, shown diagrammatically n FIG. 2, operatively connected via the serial port to compact display unit 10. Preferably, but optionally, the virtual network computing link 32 is used in conjunction with compact display unit 10 and mobile server 20 for a number of currently useful reasons, but other improved links may become available for use. Virtual network computing link ("VNC") 32 uses the Remote Frame Buffer protocol for remotely controlling another computer or server, which permits network communications. VNC is platform independent, so any operating system may be used. VNC software also makes it possible to view and fully-interact with one or more mobile computers or devices across a system such as QUALCOMM® mobile satellite communications 26. VNC also is open source code and, although not inherently secure, the compact display unit 10 and mobile server 20 may be equipped with one or more encryption options for enhanced security by users. Likewise, compact display unit 10 and mobile server 20 may be equipped with one or more software programs for detecting removal or attempted removal of the compact display unit 10 and mobile server 20 from vehicle 22, as well as unauthorized misappropriation of vehicle 22 itself.

As indicated, monitor 16 includes touch screen 28 that provides a vehicle operator a range of programmable permissive communications 18a-f in diagrammatic and graphic form. Each of the programmable permissive communications 18a-f in diagrammatic and graphic form may be masked, or deleted, from among the programmable permissive communications 18a-f that may be viewed by a vehicle operator. The vehicle operator is unable to alter such masking. Such masking usually is based on policies of the vehicle owner. For example, the owner of a vehicle may not want to allow vehicle operators to communicate with any station or remote sever 24 other than a vehicle dispatcher, so other options may be masked.

In operation, compact display unit 10 illustrated in FIGS. 1 and 4 is mounted adjacent to, in vision of, and within reach of an operator of a vehicle 22. Because compact display unit 10 lacks a full keyboard, compact display unit 10 is usually a secondary means of communication to a remote server 24 across a QUALCOMM® mobile satellite communications system 26 as shown in. FIG. 3. The QUALCOMM® mobile satellite communications system 26 also includes a media display unit 34 as shown in FIG. 2. Media display unit 34 is the primary display unit because it includes a full keyboard intended to be operated either by a second occupant of vehicle 22 during operation of vehicle 22, or by a vehicle operator while vehicle 22 is stationary. As also shown in FIG. 2, mobile server 20 is operatively connected to a satellite data modem 36 mounted on vehicle 22 that includes an antenna capable of receiving and transmitting messages to other servers within the QUALCOMM® mobile satellite communications system 26.

The compact display unit 10 shown in drawing FIGS. 1 through 3 is at least one embodiment not intended to be exclusive, but merely illustrative of the disclosed but non-exclusive embodiments. Claim elements and steps in this document have been numbered and/or lettered solely as an aid in readability and understanding. The numbering is not intended to, and should not be considered as intending to, indicate the ordering of elements and steps in the claims.

The invention claimed is:

1. A vehicle-mountable display unit, comprising:
   a housing;
   an array of buttons positioned on the housing to activate the display unit;
   a monitor mounted in the housing to present a range of programmable permissive communications to a vehicle operator for intercommunication between at least one remote base station located outside of said vehicle and the vehicle;
   a touch screen operatively connected to the monitor to present the programmed permissive communications choices to a vehicle operator, wherein said permissible communications choices are capable of being masked by said at least one remote base station, further wherein masked ones of said permissible communications choices cannot be unmasked by the vehicle operator, and wherein no keyboard for data entry into the display unit is connectable to the display unit such that the vehicle operator is precluded from entry of data into the display unit;
   a mobile server mounted in the vehicle, operatively connected to the monitor, to transmit to, and receive messages across, a mobile satellite communications system for intercommunication between at least one remote base station and the vehicle operator; and
   a separate media display unit, which is provided with a keyboard for data entry into said separate media display unit by a third party other than the vehicle operator during operation of said vehicle or by the vehicle operator while said vehicle is stationary, wherein said separate media display unit is a primary means of communication to said remote base station across said mobile satellite communications system, and wherein said display unit is a secondary means of communication to said remote base station across said mobile satellite communications system.

2. A vehicle-mountable display unit as recited in claim 1, further comprising one or more programs in the mobile server to transmit to, and receive messages from, a mobile satellite communications system.

3. A vehicle-mountable display unit as recited in claim 2, further comprising one or more programs in the mobile server to detect either removal or attempted removal of the display unit and mobile server from the vehicle, or to detect unauthorized misappropriation of the vehicle.

4. A vehicle-mountable display unit as recited in claim 1, further comprising a text-to-speech engine to control text-to-speech signals.

5. A vehicle-mountable display unit as recited in claim 1, wherein the display unit is operable by a vehicle operator while the vehicle is either stationary or moving.

6. A system for displaying pre-selected vehicle communications options, comprising:
   a mobile application server mountable in the vehicle for receipt and transmission of the communications in conjunction with a mobile satellite communications system for intercommunication between at least one remote base station and the vehicle;
   a compact display unit operatively connectable to the mobile application server for presenting a range of pre-selected permissive communications between the vehicle and the remote server by a vehicle operator during operation of the vehicle, wherein the compact display unit includes a monitor for displaying the pre-selected permissive communications to a vehicle operator for said intercommunication between a remote server and the vehicle operator, further wherein a touch screen is operatively connected to the monitor to present the pre-selected communications choices to the vehicle operator, further wherein said permissible communications choices are capable of being masked by said at least one remote base station, further wherein masked ones of said permissible communications choices cannot be unmasked by the vehicle operator, further wherein no keyboard for data entry into the display unit is connectable to the display unit such that the vehicle operator is precluded from entry of data into the display unit; and
   a separate media display unit, which is provided with a keyboard for data entry into said separate media display unit by a third party other than the vehicle operator during operation of said vehicle or by the vehicle operator while said vehicle is stationary, wherein said separate media display unit is a primary means of communication to said remote base station across said mobile satellite communications system, and wherein said display unit is a secondary means of communication to said remote base station across said mobile satellite communications system.

7. A system for displaying pre-selected vehicle communications options as recited in claim 6, further comprising means for operatively connecting the compact display unit to the mobile application server.

8. A system for displaying pre-selected vehicle communications options as recited in claim 7, wherein the means for operatively connecting the compact display unit to the mobile application server includes a communications path between the compact display unit and the mobile application server.

9. A system for displaying pre-selected vehicle communications options as recited in claim 8, wherein the communications path includes a serial port mounted in the mobile application server.

10. A system for displaying pre-selected vehicle communications options as recited in claim 9, wherein the communications path includes a virtual network computing link operatively connected via the serial port to the compact display unit.

11. A system for displaying pre-selected vehicle communications options as recited in claim 10, wherein the compact display unit includes one or more buttons positioned on the housing for activating the display unit.

* * * * *